(12) United States Patent
West

(10) Patent No.: US 7,608,227 B2
(45) Date of Patent: Oct. 27, 2009

(54) CATALYST STRUCTURE

(75) Inventor: David James West, Ducklington (GB)

(73) Assignee: CompactGTL PLC, Abingdon (GB)

( * ) Notice: Subject to any disclaimer, the term of this patent is extended or adjusted under 35 U.S.C. 154(b) by 226 days.

(21) Appl. No.: 11/677,012

(22) Filed: Feb. 20, 2007

(65) Prior Publication Data

US 2007/0197382 A1    Aug. 23, 2007

(30) Foreign Application Priority Data

Feb. 23, 2006    (GB) ................... 0603609.9

(51) Int. Cl.
*B01J 8/02*    (2006.01)
(52) U.S. Cl. .................. 422/222; 502/527.18
(58) Field of Classification Search ........................ None
See application file for complete search history.

(56) References Cited

U.S. PATENT DOCUMENTS

| | | | |
|---|---|---|---|
| 3,869,778 A | | 3/1975 | Yancey |
| 6,502,447 B2 * | | 1/2003 | Adams et al. ................ 72/326 |
| 6,534,022 B1 | | 3/2003 | Carlborg et al. |
| 2002/0074105 A1 | | 6/2002 | Hayashi et al. |
| 2003/0068259 A1 * | | 4/2003 | Etemad et al. .............. 422/189 |
| 2004/0034111 A1 * | | 2/2004 | Tonkovich et al. .......... 518/726 |

FOREIGN PATENT DOCUMENTS

| | | |
|---|---|---|
| DE | 3844350 | 7/1990 |
| EP | 0870909 | 10/1998 |
| EP | 0933131 | 8/1999 |
| FR | 2853933 | 10/2004 |
| WO | WO 01/51194 | 7/2001 |
| WO | WO 03/033131 | 4/2003 |

OTHER PUBLICATIONS

Foreign Search Report for Application No. PCT/GB2007/050068 dated Jun. 4, 2007.
Foreign Search Report for Application No. GB0603609.9 dated Apr. 27, 2006.
Foreign Search Report for Application No. PCT/GB2007/050068 dated Aug. 26, 2008.

* cited by examiner

*Primary Examiner*—Melvin C Mayes
*Assistant Examiner*—James Corno
(74) *Attorney, Agent, or Firm*—Baker Botts L.L.P.

(57) ABSTRACT

A catalyst structure comprises a foil strip (10) acting as the substrate, and which has been cut and shaped so as to define a multiplicity of peaks (15) and troughs (16) each with its axis extending across the foil, such that peaks and troughs alternate across the foil strip (10). Such a corrugated substrate may be provided with a ceramic coating incorporating a catalytic material. The corrugations enhance turbulence within a flow channel of a compact catalytic reactor.

7 Claims, 1 Drawing Sheet

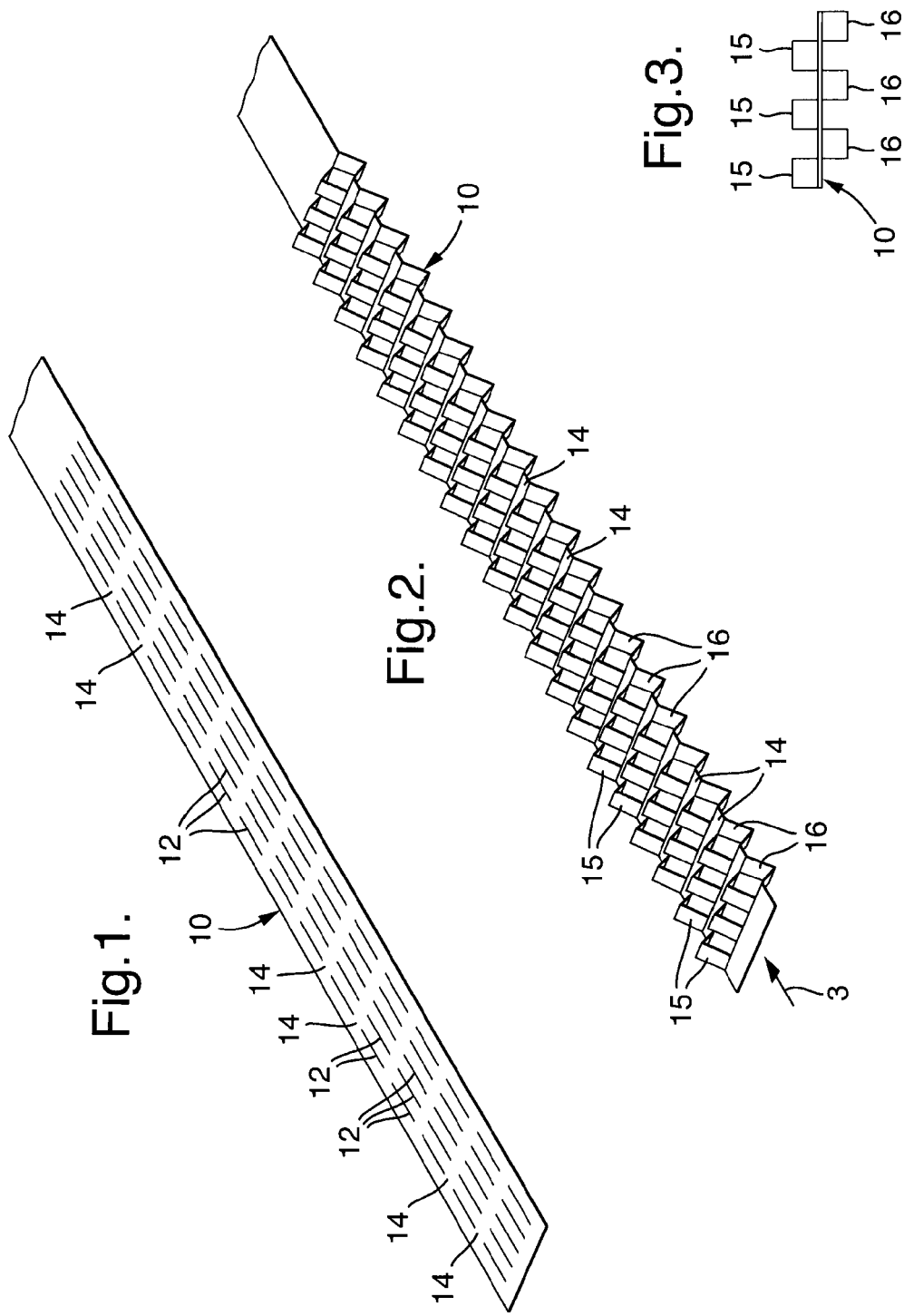

CATALYST STRUCTURE

This invention relates to a catalyst structure suitable for use in a catalytic reactor containing channels for a chemical reaction, to a process for making such a catalyst structure, and to a chemical reactor incorporating such a catalyst structure.

A process is described in WO 01/51194 and WO 03/033131 (Accentus plc) in which methane is reacted with steam, to generate carbon monoxide and hydrogen in a first catalytic reactor; the resulting gas mixture is then used to perform Fischer-Tropsch synthesis in a second catalytic reactor. The overall result is to convert methane to longer chain hydrocarbons of higher molecular weight, which are usually liquids or waxes under ambient conditions. The two stages of the process, steam/methane reforming and Fischer-Tropsch synthesis, require different catalysts, and catalytic reactors are described for each stage. In each case the catalyst may comprise a corrugated foil coated with catalytic material. The corrugations extend along the length of each channel, having the effect of subdividing the channel into many parallel sub-channels. Although such catalyst structures are effective, they must be manufactured carefully to ensure that they will fit into the channel, as the height of the corrugations must be suitable for the height of the channel, and at the same time the height of the corrugations affects the width of the corrugated foil, which is generally required to match the width of the channel.

According to the present invention there is provided a catalyst structure comprising a foil which has been cut and shaped so as to define a multiplicity of peaks and troughs each with its axis extending across the foil, such that peaks and troughs alternate across the foil.

Along the length of the foil there may be lines of peaks and lines of troughs, or alternatively there may be lines along which peaks and troughs alternate.

The peaks and troughs may have any desired shape, and may for example be triangular.

Such a catalyst structure can enhance turbulence. It may be inserted into a channel of generally rectangular cross-section, the width of the foil being such as to fit the width of the channel; forming the peaks and troughs does not alter the width of the foil.

The present invention also provides a method for making a catalyst structure, the method comprising the steps of selecting a foil of a suitable width, cutting a multiplicity of parallel slits in the foil, the slits extending in the length direction, and deforming the sections of foil between adjacent slits into peaks or troughs, so that the foil defines a multiplicity of peaks and troughs each with its axis extending across the foil, arranged such that peaks and troughs alternate across the foil.

In a third aspect, the present invention also provides a compact catalytic reactor defining a multiplicity of first and second flow channels arranged alternately in the reactor, for carrying first and second fluids, respectively, wherein at least the first fluids undergo a chemical reaction; each first flow channel containing a removable gas-permeable catalyst structure, the catalyst structure incorporating a metal foil substrate which has been cut and shaped so as to define a multiplicity of peaks and troughs each with its axis extending across the foil, such that peaks and troughs alternate across the foil.

The reactor may be made of an aluminium alloy, stainless steel, high-nickel alloys, or other steel alloys, depending on the temperature and pressure required for the reactions, and the nature of the fluids, both reactants and products. The catalyst structures do not provide strength to the reactor, so the reactor itself must be sufficiently strong to resist any pressure forces during operation. It will be appreciated that the reactor may be enclosed within a pressure vessel so as to reduce the pressure forces it experiences, or so that the pressure forces are only compressive.

The reactor must also be provided with headers to supply the fluids to the flow channels, and preferably each first header comprises a chamber attached to the outside of the reactor and communicating with a plurality of the first flow channels, and each second header comprises a chamber attached to the outside of the reactor and communicating with a plurality of the second flow channels, such that after removal of a header, the corresponding catalyst structures in the flow channels are removable. This ensures that the catalysts can easily be replaced when they become spent.

The catalyst structure preferably incorporates a ceramic coating to carry the catalytic material. Preferably the metal foil of the catalyst structure is a steel alloy that forms an adherent surface coating of aluminium oxide when heated, for example an aluminium-bearing ferritic steel such as iron with 15% chromium, 4% aluminium, and 0.3% yttrium (eg Fecralloy™). When this metal is heated in air it forms an adherent oxide coating of alumina, which protects the alloy against further oxidation and against corrosion. Where the ceramic coating is of alumina, this appears to bond to the oxide coating on the surface. The preferred substrate is a thin metal foil for example of thickness less than 100 µm. The metal substrate of the catalyst structure enhances heat transfer within the catalyst structure, preventing hot spots or cold spots, enhances catalyst surface area, and provides mechanical strength.

Where the channel depth is no more than about 3 mm, then the catalyst structure may for example be a single shaped foil. Alternatively, and particularly where the channel depth is greater than about 2 mm, the catalyst structure may comprise a plurality of such shaped foils separated by substantially flat foils. To ensure the required good thermal contact, for example with a Fischer-Tropsch reactor, the channels are preferably less than 20 mm deep, and more preferably less than 10 mm deep, and for a steam/methane reforming reactor the channels are preferably less than 5 mm deep. But the channels are preferably at least 1 mm deep, or it becomes difficult to insert the catalyst structures, and engineering tolerances become more critical. Desirably the temperature within the channels is maintained uniformly across the channel width, within about 2-4° C., and this is more difficult to achieve the larger the channel becomes.

The reactor may comprise a stack of plates. For example, first and second flow channels may be defined by grooves in respective plates, the plates being stacked and then bonded together. Alternatively the flow channels may be defined by thin metal sheets that are castellated and stacked alternately with flat sheets; the edges of the flow channels may be defined by sealing strips. The stack of plates forming the reactor is bonded together for example by diffusion bonding, brazing, or hot isostatic pressing. By way of example the plates (in plan) might be of width in the range 0.05 m up to 1 m, and of length in the range 0.2 m up to 2 m, and the flow channels are preferably of height between 1 mm and 20 mm or less (depending on the nature of the chemical reaction, as indicated above). For example the plates might be 0.3 m wide and 1.5 m long, defining channels 5 mm high.

The invention will now be further and more particularly described, by way of example only, and with reference to the accompanying drawings, in which:

FIG. 1 shows a perspective view of a metal foil during manufacture of a catalytic insert;

FIG. 2 shows a perspective view of the metal foil of FIG. 1 at a subsequent stage; and FIG. 3 shows an end view of the metal foil of FIG. 2, in the direction of arrow 3 of FIG. 2.

Referring now to FIG. 1, a catalytic structure for insertion into a rectangular channel in a compact catalytic reactor is made using a foil of Fecralloy alloy steel typically of thickness in the range 10 to 200 μm, for example 50 μm. The foil 10 is selected to be of width slightly less than that of the channel into which it is to be inserted, the difference in width providing enough clearance (e.g. 0.5 mm or 1.0 mm) to ensure that it can be slid freely into the channel. In this example the foil 10 is of width 12 mm, but the foil could be of any suitable width. The foil 10 is first subjected to a cutting process to form an array of slits 12 all of which extend longitudinally, each slit being of the same length (for example 5 mm). The slits 12 are spaced apart across the width of the foil 10, in this example being 2 mm apart, so as to form a row of slits 12 across the width, and are spaced apart longitudinally from the next row of slits 12 by for example 2 mm so that there are unslitted foil portions 14 at 5 mm separations along the length of the foil 10.

The foil 10 is then subjected to a corrugation process, for example using suitably toothed rollers, to produce the corrugations as shown in FIGS. 2 and 3. The process is such that for each slit 12 the foil sections on either side are formed into a peak 15 (on one side) and a trough 16 (on the other side), so that peaks 15 and troughs 16 alternate across the width of the strip. In the embodiment shown in FIG. 2, in the longitudinal direction successive sections are all formed as peaks 15 or all as troughs 16. In each case the axis of the peak 15 or trough 16 (that is to say a line extending along the crest of the peak, or along the bottom of the trough, or a line parallel to one of those lines) extends perpendicular to the longitudinal axis of the foil 10.

The foil 10 can then be cut to a suitable length for the channel into which it is to be inserted, preferably cutting across one of the unslitted foil portions 14. The corrugated section of foil 10 is then provided with a catalytic surface, either by depositing catalytic metal directly onto the surface of the foil 10, or by first coating the foil 10 with a ceramic coating and then depositing catalytic metal in the ceramic. The procedures for depositing the catalytic material on the foil substrate are known to the skilled man. For example the foil 10 may be coated with a ceramic coating (not shown) such as alumina of thickness typically in the range 30-80 μm (for example for combustion or steam reforming), and the active catalytic material (such as platinum/rhodium, in the case of steam reforming) is then incorporated into the ceramic. It will be appreciated that the nature of the ceramic coating and the catalytic metal will depend on the reaction which is to be performed in the reactor.

It will be appreciated that this process enables a catalyst insert to be made to any desired length, and that the width is predetermined by the width of the foil, which is unchanged by the corrugation process. The height of the peaks 15 and troughs 16 can be selected and adjusted to suit the height of the channel into which it is to be inserted. It will also be appreciated that in some cases, for example with a channel that is of height above about 4 mm, it may be preferred to use an assembly of corrugated catalyst structures separated by substantially flat foils which may also incorporate a catalytic coating. For example in a 6 mm channel there might be two corrugated foil catalyst structures each of total height 2.5 mm, separated by a substantially flat foil. In any event the corrugated foil 10 will be sufficiently flexible that the corrugations can be compressed, reducing the risk of the foil becoming jammed when inserting or removing the corrugated catalyst structure from a channel.

The profile of the foil promotes turbulence within the channel, which can lead to greater heat and mass transfer, and so a more uniform temperature profile throughout the channel, and hence improved reaction performance.

It will be appreciated that the corrugation may be carried out in a different fashion to that described above. For example, with the foil slitted as shown in FIG. 1, the corrugations might be arranged such that along a longitudinal line successive sections are alternately peaks 15 and troughs 16. The corrugations might have a different shape to that shown in FIG. 2, for example being rectangular or rounded rather than triangular. In the foil 10 shown above the unslitted foil portions 14 extend in straight lines extending perpendicular to the longitudinal axis of the foil 10, but it will be appreciated that the slits 12 might instead be arranged such that the unslitted foil portions extend in a straight line that is skew, so that adjacent peaks and troughs across the width of the foil are slightly staggered. And indeed the slits 12 might instead be arranged so that the unslitted foil portions define a curve or even a zigzag across the width of the foil 10.

It will also be understood that the slits 12 may be produced in any suitable fashion, for example by chemical etching, or by mechanically stamping; and that the lengths and separations of the slits 12 may be different from the values mentioned above.

I claim:

1. A compact catalytic reactor defining a multiplicity of first and second flow channels arranged alternately in the reactor, for carrying first and second fluids, respectively, wherein at least the first fluids undergo a chemical reaction; each first flow channel being rectangular and having a width, and containing a removable gas-permeable catalyst structure, the catalyst structure incorporating a metal foil which has been cut and shaped so as to define a multiplicity of peaks and troughs, the width of the foil being selected in relation to the width of the first flow channel to provide enough clearance that the foil can be slid freely into the first channel, wherein each of said peaks and troughs has its axis extending across the foil, such that peaks and troughs alternate across the width of the foil.

2. A reactor as claimed in claim 1 wherein along the length of the foil there are lines of peaks and lines of troughs.

3. A reactor as claimed in claim 1 wherein along the length of the foil there are lines along which peaks and troughs alternate.

4. A reactor as claimed in claim 1 wherein a line of peaks and troughs alternating across the foil extends perpendicular to the longitudinal axis of the foil.

5. A reactor as claimed in claim 1 wherein a line of peaks and troughs alternating across the foil extends skew to the longitudinal axis of the foil.

6. A reactor as claimed in claim 1 wherein the peaks and troughs are of triangular shape.

7. A method for providing a reactor with a catalyst structure, wherein the reactor defines at least one first flow channel, and wherein each first flow channel is rectangular, having a width, the method comprising the steps of selecting a foil of a width selected in relation to the width of the first flow channel to provide enough clearance that the foil can be slid freely into the first flow channel, cutting a multiplicity of parallel slits in the foil, the slits extending in the length direction, and deforming the sections of foil between adjacent slits into peaks or troughs, so that the foil defines a multiplicity of peaks and troughs each with its axis extending across the foil, arranged such that peaks and troughs alternate across the width of the foil, providing the foil with a catalytic surface to form a catalyst structure, and then inserting the catalyst structure into the first flow channel.

* * * * *